US00RE46755E

(19) United States
(12) Reissued Patent
Lin

(10) Patent Number: US RE46,755 E
(45) Date of Reissued Patent: Mar. 13, 2018

(54) METHOD FOR PLAYING CORRESPONDING 3D IMAGES ACCORDING TO DIFFERENT VISUAL ANGLES AND RELATED IMAGE PROCESSING SYSTEM

(71) Applicant: Wistron Corporation, New Taipei (TW)

(72) Inventor: Ching-An Lin, New Taipei (TW)

(73) Assignee: Wistron Corporation, New Taipei (TW)

(21) Appl. No.: 15/149,186

(22) Filed: May 9, 2016

Related U.S. Patent Documents

Reissue of:
(64) Patent No.: 8,836,773
Issued: Sep. 16, 2014
Appl. No.: 13/187,529
Filed: Jul. 21, 2011

(30) Foreign Application Priority Data

Aug. 16, 2010 (TW) ..... 99127279 A

(51) Int. Cl.
*H04N 13/04* (2006.01)
*H04N 13/02* (2006.01)

(52) U.S. Cl.
CPC ..... *H04N 13/0296* (2013.01); *H04N 13/0438* (2013.01); *H04N 13/0468* (2013.01)

(58) Field of Classification Search
CPC ..... H04N 13/0296; H04N 13/0468; H04N 13/0438
See application file for complete search history.

(56) References Cited

U.S. PATENT DOCUMENTS

| | | | | |
|---|---|---|---|---|
| 6,611,283 | B1 * | 8/2003 | Isonuma | 348/51 |
| 6,985,290 | B2 * | 1/2006 | Putilin et al. | 359/462 |
| 7,265,775 | B2 * | 9/2007 | Hirayama | 348/56 |
| 7,362,324 | B2 * | 4/2008 | Iizuka et al. | 345/419 |
| 7,405,801 | B2 * | 7/2008 | Jacobs | 352/85 |
| 8,269,822 | B2 * | 9/2012 | Zalewski | 348/56 |
| 2006/0061652 | A1 * | 3/2006 | Sato et al. | 348/53 |
| 2008/0174678 | A1 * | 7/2008 | Solomon et al. | 348/231.99 |
| 2008/0231691 | A1 * | 9/2008 | Larson | 348/56 |
| 2010/0007582 | A1 * | 1/2010 | Zalewski | A63F 13/00 345/8 |

(Continued)

FOREIGN PATENT DOCUMENTS

CN 101750746 A * 6/2010

OTHER PUBLICATIONS

Original disclosure for U.S. Appl. No. 61/329,478, (domestic priority for 2011/0267437), filed Apr. 29, 2010, 28 pages.*

(Continued)

*Primary Examiner* — Jeffrey Carlson
(74) *Attorney, Agent, or Firm* — Winston Hsu

(57) ABSTRACT

A 3D image playback method includes utilizing a detecting module to detect a visual angle included between a display device and a shutter glasses, playing a plurality of 3D image sets with different visual angles at a specific frequency by the display device, transmitting a synchronization signal corresponding to the visual angle to the shutter glasses by the detecting module, and controlling a switching frequency of the shutter glasses so as to make the shutter glasses capable of receiving one of the plurality of 3D image sets corresponding to the visual angle.

8 Claims, 7 Drawing Sheets

(56) References Cited

U.S. PATENT DOCUMENTS

| | | | | |
|---|---|---|---|---|
| 2010/0201790 | A1* | 8/2010 | Son | G02B 27/2264 348/53 |
| 2011/0267437 | A1* | 11/2011 | Abeloe | H04N 13/0438 348/51 |
| 2012/0023518 | A1* | 1/2012 | Meuninck | H04N 21/4755 725/25 |

OTHER PUBLICATIONS

Office action mailed on May 17, 2013 for the Taiwan application No. 099127279, filing date: Aug. 16, 2010, p. 1 line 7-11 and line 13-14, p. 2 line 1-23 and line 25-26, p. 3 line 1-14 and line 18-20 and enclosure.

* cited by examiner

METHOD FOR PLAYING CORRESPONDING 3D IMAGES ACCORDING TO DIFFERENT VISUAL ANGLES AND RELATED IMAGE PROCESSING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a method for playing 3D images and a related image processing system, and more particularly, to a method for playing corresponding 3D images according to different visual angles and a related image processing system.

2. Description of the Prior Art

In general, 3D images are transmitted as left eye images and right eye images viewed by the left eye and the right eye, respectively. The images received by the two eyes are matched as a 3D image that has focal range and gradation according to a discrepancy between visual angles of the two eyes. Some common methods utilized for generating 3D images include polarizing glasses, shutter glasses, an anaglyph, and an auto-stereoscopic display. More detailed description for the principle of the shutter glasses commonly seen in the prior art will be illustrated as follows.

Shutter glasses sequentially open the left lens and the right lens of a pair of glasses. When the right lens is open, right eye images may be transmitted to the right eye from a display screen at the same time. When the left lens is open, left eye images may be transmitted to the left eye from the display screen at the same time. The method is commonly used in I-MAX movie theaters or 3D theaters. In addition, switching speed of the left lens and the right lens needs to be very fast for preventing twinkle in the 3D images. In general, the user may feel comfortable at a switching speed of over sixty times per second.

In the aspect of using the shutter glasses, before viewing the 3D image, the user needs to wear the shutter glasses first. In addition, an angle between the user wearing the shutter glasses and a display device playing the 3D image needs to be equal to a specific visual angle. For example, the user needs to be in front of the display device.

In order to solve the above-mentioned problem that the 3D image can just be viewed at one single visual angle, many methods for enhancing the visual angle of the 3D image have been developed. A method commonly seen in the prior art is to enhance range of the visual angle of the 3D image by utilize an image algorithm. Accordingly, it will enhance convenience for viewing the 3D image and can be applied to a multi-user environment. However, the said method causes a complicated algorithm so as to increase difficulty of making the 3D image. In addition, although the said method allows that the user can view the 3D image at different locations, all the 3D images that the user views have the same visual angle. Thus, the said method can only provide the user with a poor 3D visual feeling.

SUMMARY OF THE INVENTION

Therefore, the present invention provides a method for playing corresponding 3D images according to different visual angles and a related image processing system to solve the problem mentioned above.

The present invention provides a method for playing corresponding 3D images according to different visual angles. The method includes utilizing a detecting module to detect a visual angle included between a display device and a shutter glasses, playing a plurality of 3D image sets with different visual angles at a specific frequency by the display device, transmitting a synchronization signal corresponding to the visual angle to the shutter glasses by the detecting module, and controlling a switching frequency of the shutter glasses according to the synchronization signal so as to make the shutter glasses capable of receiving one of the plurality of 3D image sets corresponding to the visual angle.

The present invention further provides an image processing system for playing a corresponding 3D image according to different visual angles. The image processing system includes a display device for playing a plurality of 3D image sets at a specific frequency, and a shutter glasses for receiving one of the plurality of 3D image sets corresponding to the visual angle. The shutter glasses is located at a position corresponding to a visual angle included between the display device and the shutter glasses. The image processing system further includes a detecting module coupled to the display device and the shutter glasses. The detecting module is used for detecting the visual angle and transmitting a synchronization signal corresponding to the visual angle to the shutter glasses so as to control a switching frequency of the shutter glasses.

These and other objectives of the present invention will no doubt become obvious to those of ordinary skill in the art after reading the following detailed description of the preferred embodiment that is illustrated in the various figures and drawings.

DETAILED DESCRIPTION

An embodiment of the present invention utilizes an infrared detecting device to detect a distance between a shutter glasses and a display device for playing a plurality of 3D images according to different visual angles, and utilizes the cosine law to calculate a visual angle included between the display device and the shutter glasses. Accordingly, it can achieve 2D and 3D positioning and transmit a synchronization control signal corresponding to the visual angle to control a frequency of the shutter of the shutter glasses, so as to make the shutter glasses receive one of the plurality of 3D images corresponding to the visual angle. In such a manner, the present invention allows a user wearing the shutter glasses to view the corresponding 3D image according to different visual angles so as to provide the user with an improved 3D visual feeling.

It should be noted that a 2D or 3D positioning method is commonly seen in the prior art. For example, Taiwan Patent No. 457447 discloses a transmitter of electromagnetic field three-dimensional positioning system, wherein the transmitter varies the electromagnetic fields of the transmitting coils X, Y, Z when the receiving coils X, Y, Z approach the transmitting coordinates x, y, z, that is, switching the transmitting coordinates to enhance accuracy of positioning. Taiwan Patent No. 1298799 discloses a positioning system by using continuous ultrasonic signal and using a detector with multiple receivers to perform positioning of the positioning elements. Therefore, the method for performing 2D or 3D positioning between the display device and the shutter glasses in the present invention is not limited to the said infrared detecting design, meaning that all designs capable of performing positioning between the display device and the shutter glasses by using a detecting module fall within the scope of the present invention.

Figure 1:
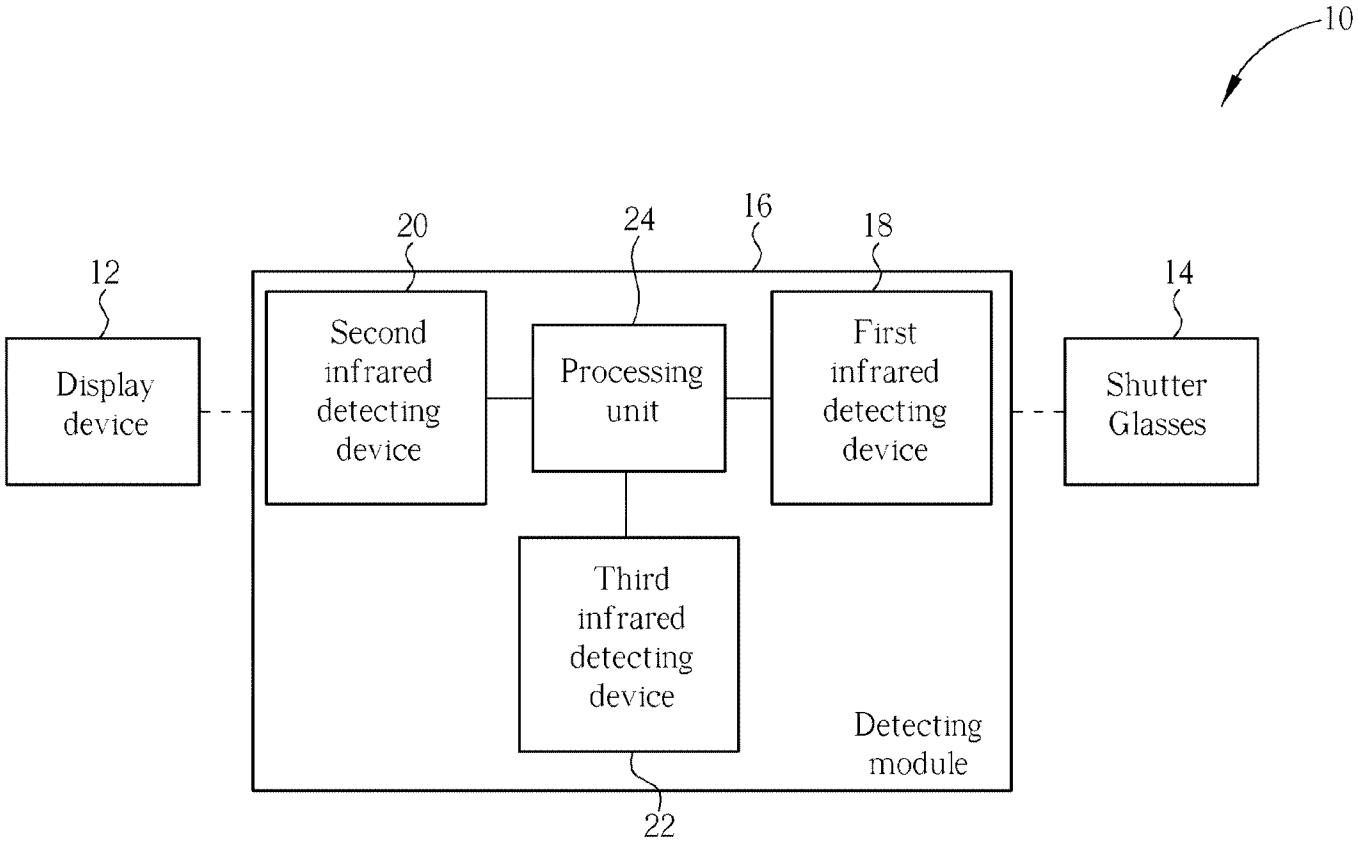
FIG. 1 is a functional block diagram of an image processing system according to an embodiment of the present invention.

Please refer to FIG. 1, which is a functional block diagram of an image processing system 10 according to an embodiment of the present invention. As shown in FIG. 1, the image processing system 10 includes a display device 12, a shutter glasses 14 and a detecting module 16. The display device 12 is used for playing a plurality of 3D image sets with different visual angles at a specific frequency, and is preferably a conventional video apparatus, such as a liquid crystal display device and so on. The shutter glasses 14 is located at a position corresponding to a visual angle included between the display device 12 and the shutter glasses 14. In this embodiment, The shutter glasses 14 is preferably an infrared shutter glasses for receiving one of the plurality of 3D image sets corresponding to the visual angle. The detecting module 16 is coupled to the display device 12 and the shutter glasses 14, and is used for detecting the visual angle and transmitting a synchronization signal corresponding to the visual angle to the shutter glasses 14.

Figure 2:
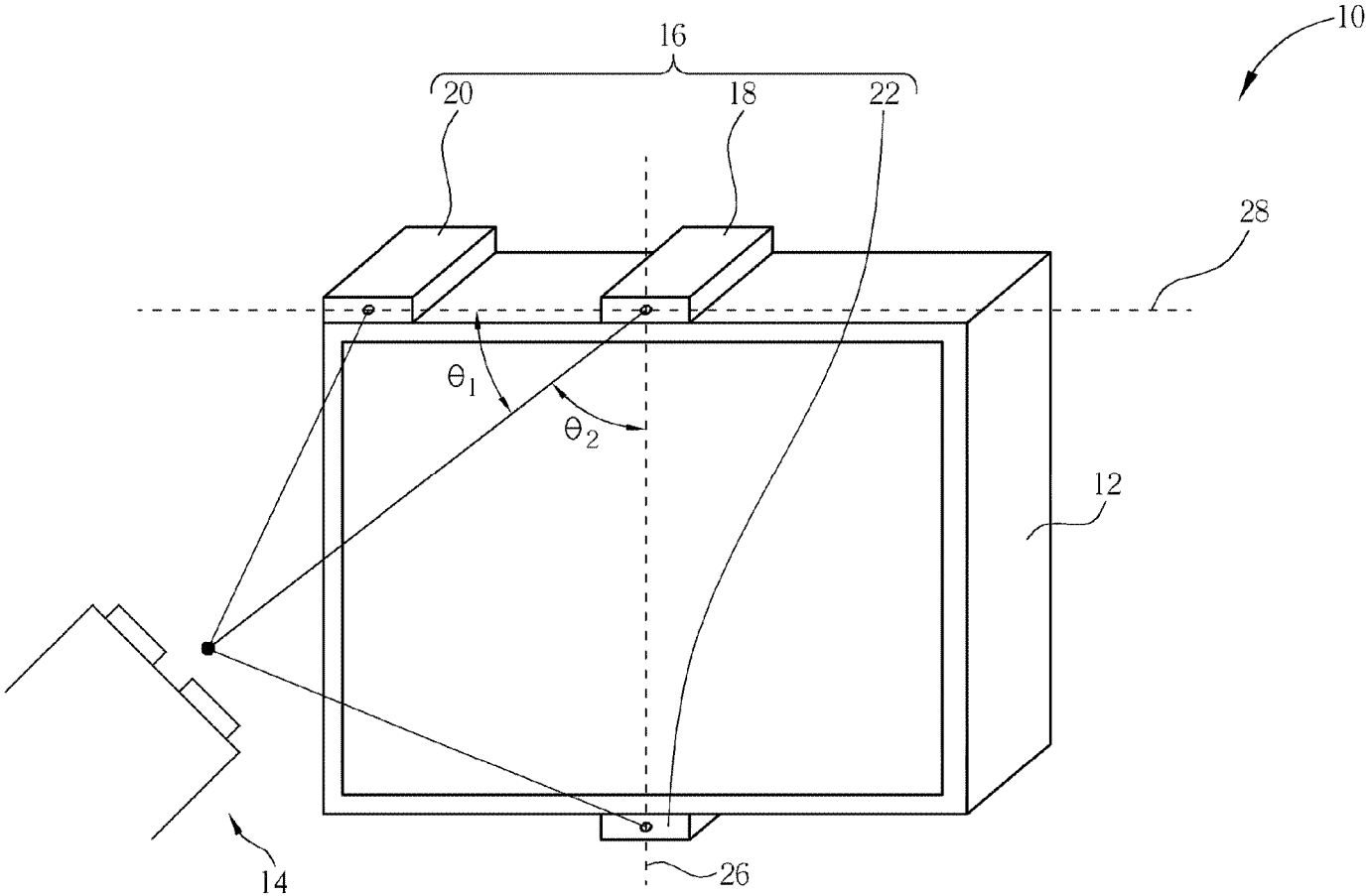
FIG. 2 is a diagram of the image processing system in FIG. 1.

Please refer to FIG. 1 and FIG. 2. FIG. 2 is a diagram of the image processing system 10 in FIG. 1. The detecting module 16 includes a first infrared detecting device 18, a second infrared detecting device 20, a third infrared detecting device 22 and a processing unit 24. The first infrared detecting device 18, the second infrared detecting device 20 and the third infrared detecting device 22 can be a conventional infrared device for detecting distance. In this embodiment, the first infrared detecting device 18, the second infrared detecting device 20 and the third infrared detecting device 22, which are located at different positions of the display device 12, are used for detecting a distance between the display device 12 and the shutter glasses 14, respectively.

As shown in FIG. 2, the first infrared detecting device 18 is disposed at a position corresponding to a vertical center axis 26 of the display device 12. In this embodiment, the first infrared detecting device 18 is preferably disposed on a top side of the display device 12 corresponding to the vertical center axis 26. The second infrared detecting device 20 is disposed at the same horizontal axis 28 with the first infrared detecting device 18. In this embodiment, the second infrared detecting device 20 is preferably disposed at an upper left corner of the display device 12. The third infrared detecting device 22 is disposed at another position corresponding to the vertical center axis 26 of the display device 12. In this embodiment, the third infrared detecting device 22 is preferably disposed on a bottom side of the display device 12 corresponding to the vertical center axis 26. The processing unit 24 is coupled to the first infrared detecting device 18, the second infrared detecting device 20 and the third infrared detecting device 22. The processing unit 24 is a conventional processor with function of data processing and control, and is used for calculating the visual angle included between the shutter glasses 14 and the display device 12 according to the cosine law and distances among the first infrared detecting device 18, the second infrared detecting device 20, the third infrared detecting device 22 and the shutter glasses 14.

As shown in FIG. 2, the visual angle includes a first offset angle $\theta_1$ included between the shutter glasses 14 and the horizontal axis 28 relative to the first infrared detecting device 18, and a second offset angle $\theta_2$ included between the shutter glasses 14 and the vertical center axis 26 relative to the first infrared detecting device 18. In addition, the processing unit 24 is further used for controlling the first infrared detecting device 18 to transmit the synchronization signal corresponding to the visual angle to the shutter glasses 14, so as to control a switching frequency of the shutter glasses 14. Accordingly, the shutter glasses 14 can receive one of the plurality of 3D image sets corresponding to the visual angle.

Figure 3:
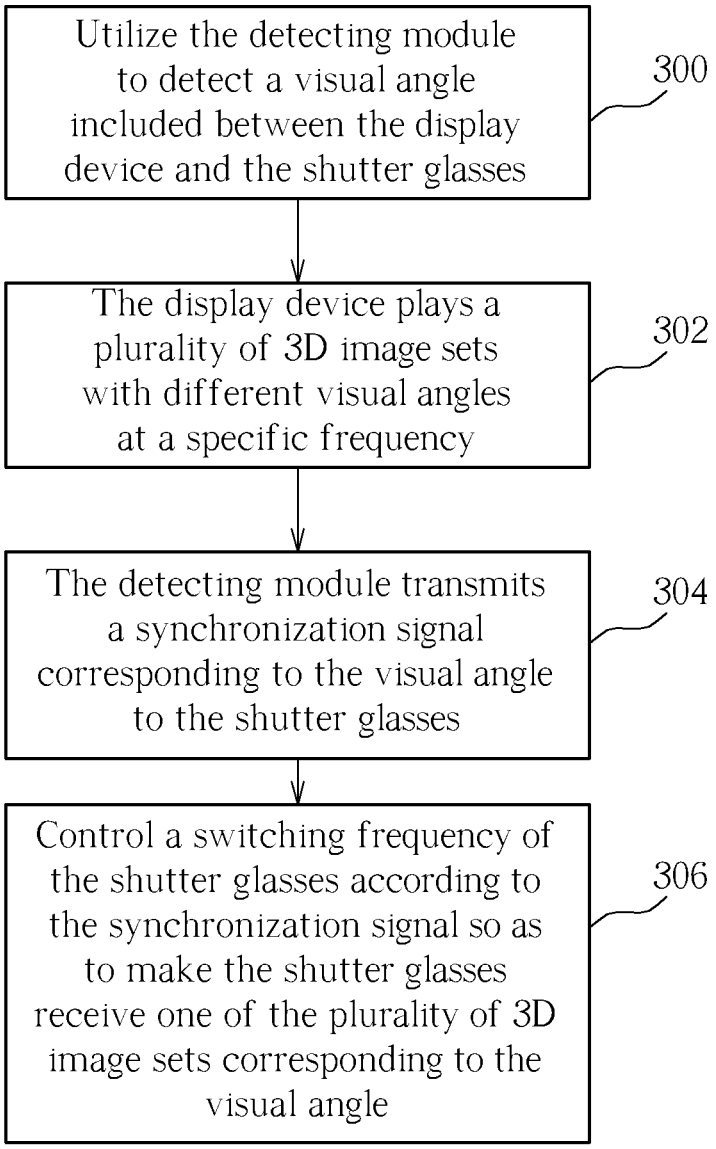
FIG. 3 is a flowchart of a method for utilizing the image processing system in FIG. 2 to play the corresponding 3D image according to different visual angles.

Next, please refer to FIG. 3, which is a flowchart of a method for utilizing the image processing system 10 in FIG. 2 to play the corresponding 3D image according to different visual angles. The method includes the following steps.

Step 300: Utilize the detecting module 16 to detect a visual angle included between the display device 12 and the shutter glasses 14;

Step 302: The display device 12 plays a plurality of 3D image sets with different visual angles at a specific frequency;

Step 304: The detecting module 16 transmits a synchronization signal corresponding to the visual angle to the shutter glasses 14;

Step 306: Control a switching frequency of the shutter glasses 14 according to the synchronization signal so as to make the shutter glasses 14 receive one of the plurality of 3D image sets corresponding to the visual angle.

More detailed description for the said steps is illustrated as follows. In Step 300, the image processing system 10 utilizes the detecting module 16 to detect the first offset angle $\theta_1$ and the second offset angle $\theta_2$ as shown in FIG. 2, so as to perform positioning of the shutter glasses 14. In other words, in this embodiment, the image processing system 10 performs the horizontal positioning and the vertical positioning of the shutter glasses 14 relative to the display device 12 by calculating the horizontal offset angle and the vertical downward offset angle of the shutter glasses relative to the first infrared detecting device 18, so as to make the detecting module 16 have a 3D positioning function. More detailed description for how to utilize the detecting module 16 to calculate the horizontal offset angle and the vertical downward offset angle of the shutter glasses 14 relative to the first infrared detecting device 18 is provided as follows.

Figure 4:
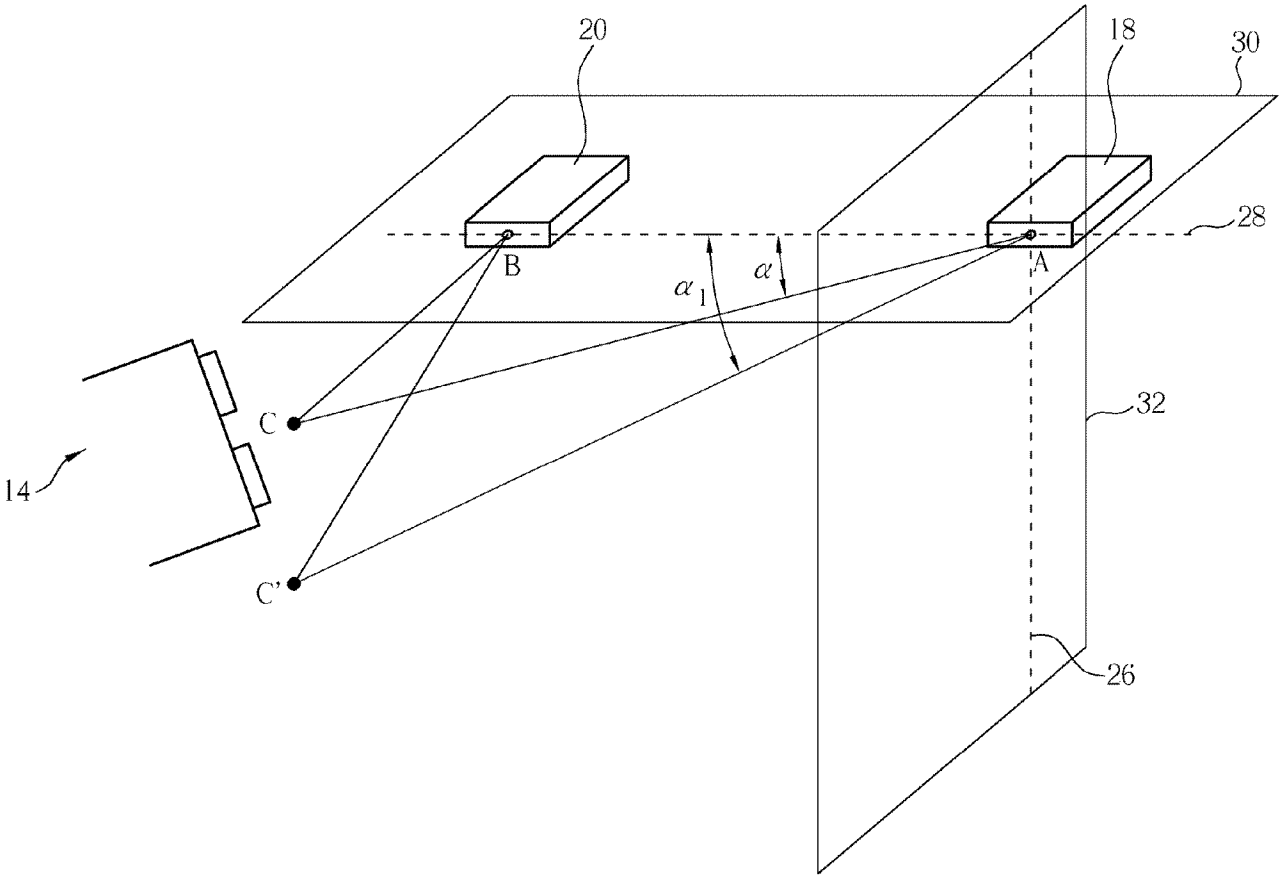
FIG. 4 is a diagram showing a shutter glasses located at a position C and a position C' relative to a first infrared detecting device and a second infrared detecting device.

First, variation of the offset angle included between the horizontal axis 28 and the line formed by the shutter glasses 14 and the first infrared detecting device 18 when the shutter glasses 14 is located at different altitudes is illustrated. Please refer to FIG. 4, which is a diagram showing the shutter glasses 14 located at a position C and a position C' relative to the first infrared detecting device 18 and the second infrared detecting device 20 (the positions C and C' can be regarded as a center position of the left lens and the right lens of the shutter glasses 14). A position where the first infrared detecting device 18 is located is set as a position A (i.e. a position at the top side of the display device 12 corresponding to the vertical center axis 26 in FIG. 2). A position where the second infrared detecting device 20 is located is set as a position B (i.e. a position at the upper left corner of the display device 12 in FIG. 2).

When the shutter glasses 14 is located at the position C, it represents that the shutter glasses 14 is located on the same horizontal surface (i.e. a horizontal surface 30 in FIG. 4) with the horizontal axis 28 and an offset angle $\alpha$ (i.e. ∠BAC) is included between the horizontal axis 28 and the line formed by the shutter glasses 14 and the first infrared detecting device 18. When the shutter glasses 14 is located at the position C', meaning that the shutter glasses 14 moves vertically downward by a distance from the position C, an offset angle $\alpha_1$ (i.e. ∠BAC') is included between the horizontal axis 28 and the line formed by the shutter glasses 14 and the first infrared detecting device 18. The distance variation range from the position C' to the position C corresponds to a vertical height of the display device 12 from its top edge to its bottom edge.

For example, if the display device 12 is a 32-inch liquid crystal display screen (i.e. the distance from the position A to the position B is about 33 cm), the distance variation range from the position C' to the position C is between 0 and 36 cm. In this example, it is assumed that the distance from the position C to the position C' is equal to 36 cm. Since a distance from the position A to the position C and a distance from the position B to the position C can be measured by the first infrared detecting device 18 and the second infrared detecting device 20 and the distance from the position A to the position B is equal to 33 cm, the offset angle $\alpha$ (i.e. ∠BAC) can be calculated by the cosine law. For example, if the distance from the position A to the position C is 450 cm and the distance from the position B to the position C is 434 cm, the offset angle $\alpha$ is calculated as 60 degree ($\cos^{-1}\{[(450)^2+(33)^2-(434)^2]/[2*(450)*(33)]\}$), and furthermore, since ∠ACC' is a right angle, the distance from the position A to the position C' can be calculated as 451.4 cm by Pythagorean theorem ($AC'^2=AC^2+CC'^2$). Similarly, the distance from the position B to the position C' can be calculated as 435.5 cm. Accordingly, the offset angle $\alpha_1$ can be further calculated as 59.4 degree by the cosine law.

To be summarized, the above-mentioned algorithm can result in that the offset angle $\alpha_1$ is approximately equal to the offset angle $\alpha$. If the offset angle $\alpha$ varies (variation range is from 0 degree to 180 degree) or if the distance from the position C' to the position C is altered (variation range is from 0 to 36 cm), it can also result in the same conclusion based on the above-mentioned algorithm.

For example, if the distance from the position C to the position C' is equal to 20 cm, the distance from the position A to the position C is 500 cm, and the distance from the position B to the position C is 471.7 cm, the offset angle $\alpha$ is calculated as 30 degree ($\cos^{-1}\{[(500)^2+(33)^2-(471.7)^2]/[2*(500)*(33)]\}$). Since ∠ACC' is a right angle, the distance from the position A to the position C' can be calculated as 500.4 cm by Pythagorean theorem ($AC'^2=AC^2+CC'2$). Similarly, the distance from the position B to the position C' can be calculated as 472.1 cm, and then the offset angle $\alpha_1$ can be calculated as 29.9 degree by the cosine law, meaning that the offset angle $\alpha_1$ is approximately equal to the offset angle $\alpha$. As for examples for other variation of distance and angle, they may be reasoned by analogy.

In summary, no matter how the distance from the position C' to the position C varies, when the shutter glasses 14 is located at the position C', the offset angle $\alpha_1$ can be substantially equal to the offset angle $\alpha$. As a result, the complementary angle calculated by the offset angle $\alpha$ being subtracted from 90 degree can be regarded as an angle included between a vertical center surface 32 in FIG. 4 (i.e. a plane which passes through the vertical center axis 26 and is perpendicular to the horizontal surface 30) and the line formed by the shutter glasses 14 and the first infrared detecting device 18 when the shutter glasses 14 is located at the position C. The said complementary angle can be defined as the said horizontal offset angle of the shutter glasses 14 on the horizontal surface 30 relative to the first infrared detecting device 18.

As mentioned above, no matter where the shutter glasses 14 is, the offset angle, which is included between the horizontal axis 28 and the line formed by the shutter glasses 14 and the first infrared detecting device 18 and is calculated by the detecting module 16 according to the cosine law, can be regarded as the offset angle included between the horizontal axis 28 and the line formed by the shutter glasses 14 and the first infrared detecting device 18 after the shutter glasses 14 vertically moves from the original position to the horizontal surface 30. Then, the complementary angle, which is calculated from the said offset angle being subtracted from 90 degree, can be regarded as the horizontal offset angle of the shutter glasses 14 relative to the first infrared detecting device 18 on the horizontal surface 30 as mentioned above. Accordingly, the horizontal positioning of the shutter glasses 14 by using the first infrared detecting device 18 and the second infrared detecting device 20 can be achieved.

Figure 5:
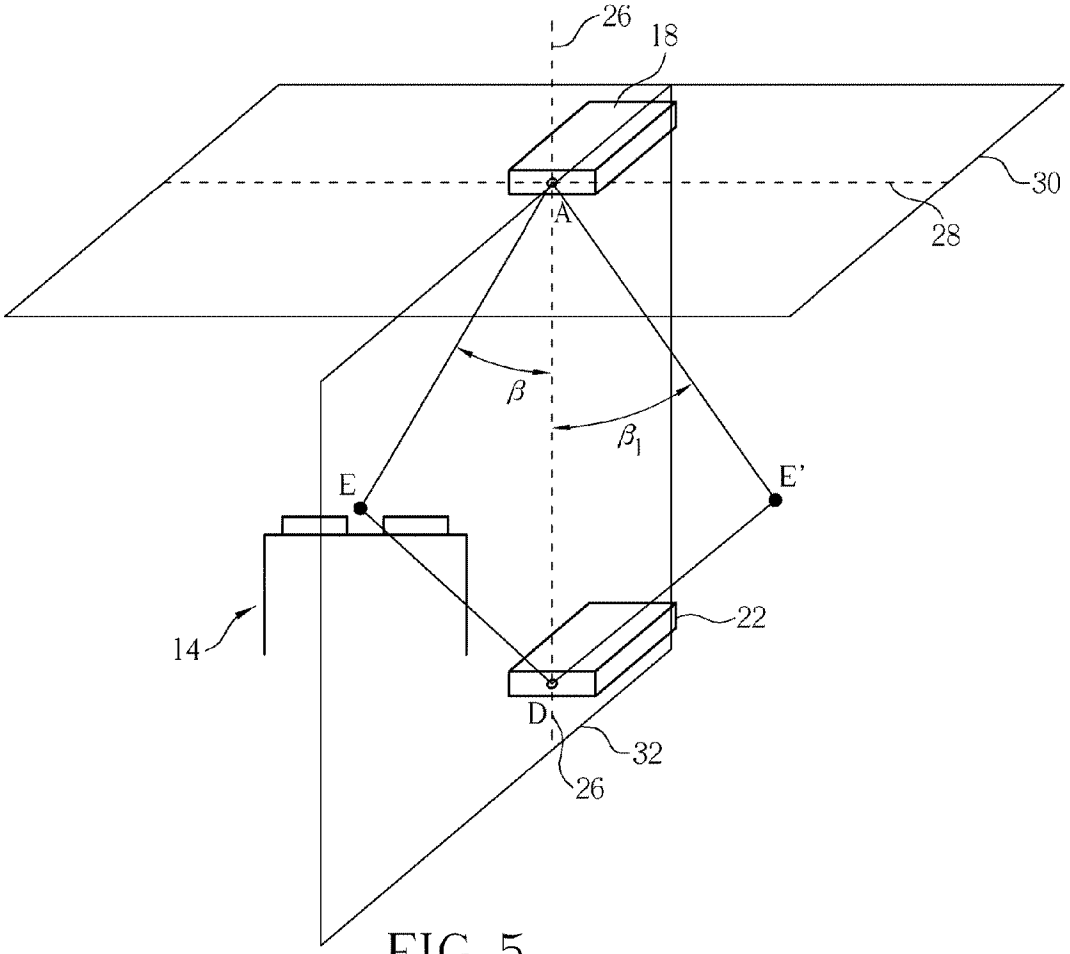
FIG. 5 is a diagram showing the shutter glasses located at a position E and a position E' relative to the first infrared detecting device and a third infrared detecting device.

The following is description for variation of the offset angle included between the vertical center axis 26 and the line formed by the shutter glasses 14 and the first infrared detecting device 18 when the shutter glasses 14 is located at different horizontal positions. Please refer to FIG. 5, which is a diagram showing the shutter glasses 14 located at a position E and a position E' relative to the first infrared detecting device 18 and the third infrared detecting device 22 (the positions E and E' can be regarded as a center position of the left lens and the right lens of the shutter glasses 14). A position where the first infrared detecting device 18 is located is set as the position A (i.e. a position at the top side of the display device 12 corresponding to the vertical center axis 26 in FIG. 2). A position where the third infrared detecting device 22 is located is set as a position D (i.e. a position at the bottom side of the display device 12 corresponding to the vertical center axis 26 in FIG. 2).

When the shutter glasses 14 is located at the position E, it represents that the shutter glasses 14 is located on the vertical center surface 32 and an offset angle $\beta$ (i.e. ∠EAD) is included between the vertical center axis 26 and the line formed by the shutter glasses 14 and first infrared detecting device 18. When the shutter glasses 14 is located at the position E', meaning that the shutter glasses 14 moves horizontally by a distance from the position E, an offset angle $\beta_1$ (i.e. ∠E'AD) is included between the vertical center axis 26 and the line formed by the shutter glasses 14 and the first infrared detecting device 18. The distance variation range from the position E' to the position E corresponds to a horizontal width of the display device 12 from the vertical center axis 26 to its side edge.

For example, if the display device 12 is a 32-inch liquid crystal display screen (i.e. the distance from the position A to the position D is about 36 cm), the distance variation range from the position E' to the position E is between 0 and 33 cm. In this example, it is assumed that the distance from the position E to the position E' is equal to 33 cm. Since a distance from the position A to the position E and a distance from the position D to the position E can be measured by the first infrared detecting device 18 and the third infrared detecting device 22 and the distance from the position A to the position D is equal to 36 cm, the offset angle β (i.e. ∠EAD) can be calculated by the cosine law. For example, if the distance from the position A to the position E is 450 cm and the distance from the position D to the position E is 433.12 cm, the offset angle β is calculated as 60 degree ($\cos^{-1}\{[(450)^2+(36)^2-(433.12)^2]/[2*(450)*(36)]\}$), and furthermore, since ∠AEE' is a right angle, the distance from the position A to the position E' can be calculated as 451.2 cm by Pythagorean theorem ($AE'^2=AE^2+EE'^2$). Similarly, the distance from the position D to the position E' can be calculated as 434.37 cm. Accordingly, the offset angle $\beta_1$ can be further calculated as 60.08 degree by the cosine law.

To be summarized, the above-mentioned algorithm can result in that the offset angle $\beta_1$ is approximately equal to the offset angle β. If the offset angle β varies (variation range is from 0 degree to 90 degree) or if the distance from the position E' to the position E is altered (variation range is from 0 to 33 cm), it can also result in the same conclusion based on the above-mentioned algorithm. For example, if the distance from the position E to the position E' is equal to 20 cm, the distance from the position A to the position E is 500 cm, and the distance from the position D to the position E is 469.17 cm, the offset angle β is calculated as 30 degree ($\cos^{-1}\{[(500)^2+(36)^2-(469.17)^2]/[2*(500)*(36)]\}$). Since ∠AEE' is a right angle, the distance the position A to the position E' can be calculated as 500.4 cm by Pythagorean theorem ($AE'^2=AE^2+EE'^2$). Similarly, the distance from the position D to the position E' can be calculated as 468.59 cm, and then the offset angle $\beta_1$ can be calculated as 30.06 degree by the cosine law, meaning that the offset angle $\beta_1$ is approximately equal to the offset angle β. As for examples for other variation of distance and angle, they may be reasoned by analogy.

In summary, no matter how the distance from the position E' to the position E varies, when the shutter glasses 14 is located at the position E', the offset angle $\beta_1$ can be substantially equal to the offset angle β. As a result, the complementary angle calculated by the offset angle β being subtracted from 90 degree can be regarded as an angle included between the horizontal surface 30 in FIG. 4 and the line formed by the shutter glasses 14 and the first infrared detecting device 18 when the shutter glasses 14 is located at the position E. The said complementary angle can be defined as the said vertical downward offset angle of the shutter glasses 14 on the vertical center surface 32 relative to the first infrared detecting device 18.

As mentioned above, no matter where the shutter glasses 14 is, the offset angle, which is included between the vertical center axis 26 and the line formed by the shutter glasses 14 and the first infrared detecting device 18 and calculated by the detecting module 16 according to the cosine law, can be regarded as the offset angle included between the vertical center axis 26 and the line formed by the shutter glasses 14 and the first infrared detecting device 18 after the shutter glasses 14 horizontally moves from the original position to the vertical center surface 32. Then, the complementary angle, which is calculated from the said offset angle being subtracted from 90 degree, can be regarded as the vertical downward offset angle of the shutter glasses 14 relative to the first infrared detecting device 18 on the vertical center surface 32 as mentioned above. Accordingly, the vertical positioning of the shutter glasses 14 by using the first infrared detecting device 18 and the third infrared detecting device 22 can be achieved.

Figure 6:
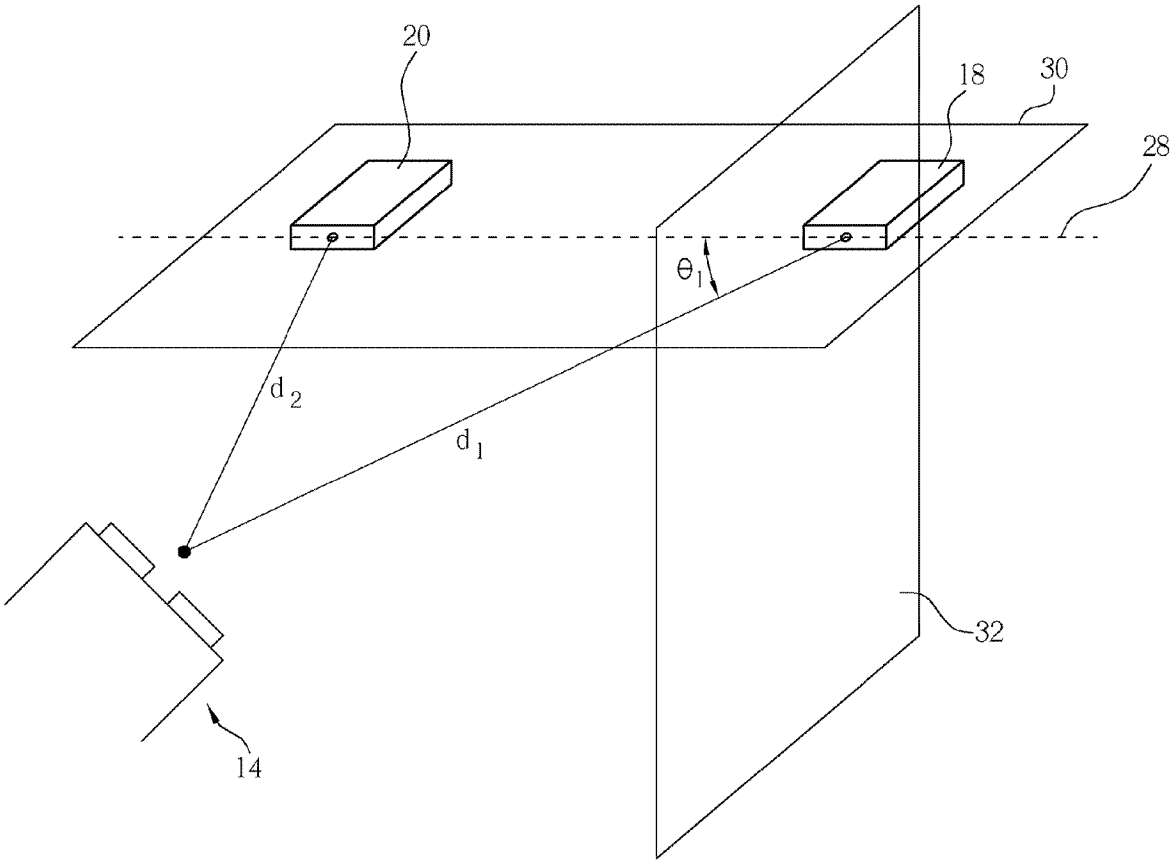
FIG. 6 is a diagram showing a position of the shutter glasses relative to the first infrared detecting device and the second infrared detecting device.

The following is description for detecting of the first offset angle $\theta_1$ in FIG. 2 according to the said algorithm. Please refer to FIG. 6, which is a diagram showing a position of the shutter glasses 14 relative to the first infrared detecting device 18 and the second infrared detecting device 20. In the aspect of calculation for the distances from the shutter glasses 14 to the first infrared detecting device 18 and the second infrared detecting device 20, the first infrared detecting device 18 can calculate a first distance $d_1$ from the first infrared detecting device 18 to the shutter glasses 14 according to a wavelength of the infrared ray and time that the infrared ray goes forth and back between the first infrared detecting device 18 and the shutter glasses 14.

Similarly, the second infrared detecting device 20 can calculate a second distance $d_2$ from the second infrared detecting device 20 to the shutter glasses 14 according to the wavelength of the infrared ray and time that the infrared ray goes forth and back between the second infrared detecting device 20 and the shutter glasses 14. After detecting the first distance $d_1$ and the second distance $d_2$, the processing unit 24 can calculate the first offset angle $\theta_1$ according to the first distance $d_1$, the second distance $d_2$, the distance between the first infrared detecting device 18 and the second infrared detecting device 20, and the cosine law. As mentioned above, the first offset angle $\theta_1$ can be substantially regarded as an offset angle included between the horizontal axis 28 and the line formed by the shutter glasses 14 and the first infrared detecting device 18 after the shutter glasses 14 moves vertically from the original position to the horizontal surface 30. Finally, by subtracting the first offset angle $\theta_1$ from 90 degree, the processing unit 24 can calculate an angle included between the vertical center surface 32 and the line formed by the shutter glasses 14 and the first infrared detecting device 18 after the shutter glasses 14 moves vertically from the original position to the vertical center surface 32, so as to achieve the above-mentioned horizontal positioning of the shutter glasses 14.

Figure 7:
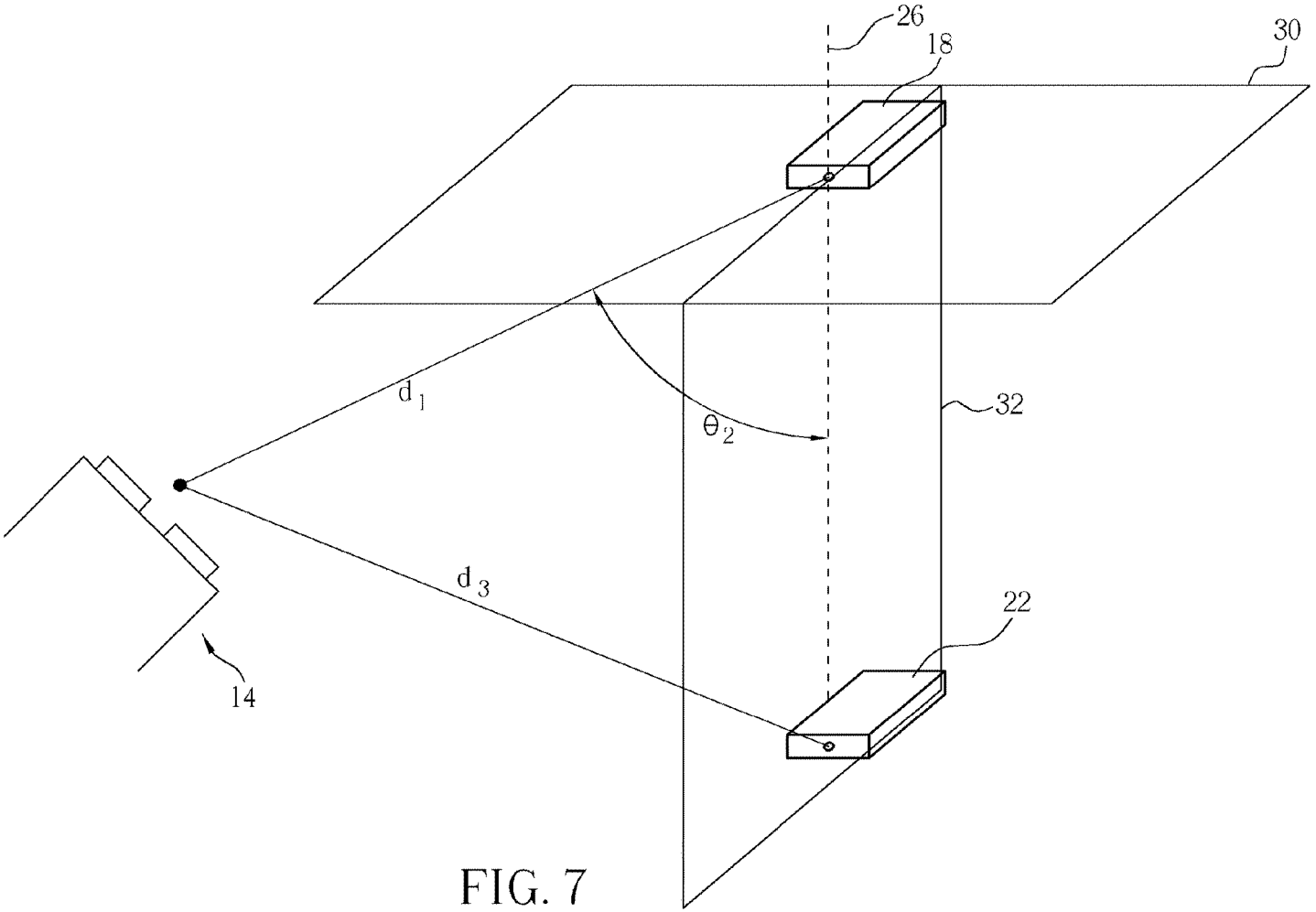
FIG. 7 is a diagram showing a position of the shutter glasses relative to the first infrared detecting device and the third infrared detecting device in FIG. 2.

As for detecting of the second offset angle $\theta_2$, please refer to FIG. 7, which is a diagram showing a position of the shutter glasses 14 relative to the first infrared detecting device 18 and the third infrared detecting device 22 in FIG. 2. In the aspect of calculation for the distances from the shutter glasses 14 to the first infrared detecting device 18 and the third infrared detecting device 22, the first infrared detecting device 18 can calculate the first distance $d_1$ from the first infrared detecting device 18 to the shutter glasses 14 according to the wavelength of the infrared ray and the time that the infrared ray goes forth and back between the first infrared detecting device 18 and the shutter glasses 14.

Similarly, the third infrared detecting device 22 can calculate a third distance $d_3$ from the third infrared detecting device 22 to the shutter glasses 14 according to the wavelength of the infrared ray and time that the infrared ray goes forth and back between the third infrared detecting device 22 and the shutter glasses 14. After detecting the first distance $d_1$ and the third distance $d_3$, the processing unit 24 can calculate the second offset angle $\theta_2$ according to the first distance $d_1$, the third distance $d_3$, the distance between the first infrared detecting device 18 and the third infrared detecting device 22, and the cosine law. As mentioned above, the second offset angle $\theta_2$ can be substantially regarded as an offset angle included between the vertical center axis 26 and the line formed by the shutter glasses 14 and the first infrared detecting device 18 after the shutter glasses 14 moves horizontally from the original position to the vertical center surface 32. Finally, by subtracting the second offset angle $\theta_2$ from 90 degree, the processing unit 24 can calculate an angle included between the horizontal surface 30 and the line formed by the shutter glasses 14 and the first infrared detecting device 18 after the shutter glasses 14 moves horizontally from the original position to the vertical center surface 32, so as to achieve the above-mentioned vertical positioning of the shutter glasses 14.

Briefly speaking, in Step 300, by using the detecting module 16 to detect the first offset angle $\theta_1$ and the second offset angle $\theta_2$, the image processing system 10 can detect the horizontal offset angle and vertical downward offset angle of the shutter glasses relative to the first infrared detecting device 18, so as to achieve 3D positioning.

Next, in Step 302, the display device 12 plays the plurality of 3D image sets with different visual angles at the specific frequency. In this embodiment, the display device 12 preferably plays left-eye images and right-eye images of the plurality of 3D image sets at 120 Hz alternately in turn, such as alternately playing three sets of 3D image sets in turn, that is, playing a non-offset left-eye image, a left-eye image with a leftward offset of 15 degree, a left-eye image with a rightward offset of 15 degree, a non-offset right-eye image, a right-eye image with a leftward offset of 15 degree and a right-eye image with a rightward offset of 15 degree in turn. It should be noticed that the plurality of 3D image sets is preferably obtained by photographing from positions at different visual angles. As for how many sets of 3D image sets that the display device 12 plays at the specific frequency, it depends on practical applications of the image processing system 10.

During the process the display device 12 plays the plurality of 3D image sets with different visual angles at the specific frequency, the detecting module 16 transmits a synchronization signal corresponding to the visual angle to the shutter glasses 14 (Step 304). Then, the shutter glasses 14 controls a switching frequency of the left lens and the right lens of the shutter glasses 14, so as to make the shutter glasses 14 capable of receiving one of the plurality of 3D image sets corresponding to the visual angle (Step 306). Accordingly, the user can view the 3D image corresponding to the visual angle via the shutter glasses 14 at a position corresponding to the visual angle.

For example, it is supposed that the display device 12 plays the non-offset left-eye image, the left-eye image with the leftward offset of 15 degree, the left-eye image with the rightward offset of 15 degree, the non-offset right-eye image, the right-eye image with the leftward offset of 15 degree and the right-eye image with the rightward offset of 15 degree in turn at 120 Hz. At this time, if the detecting module 16 detects that the shutter glasses 14 only offsets leftward relative to the vertical center surface 32 by 15 degree, the detecting module 16 transmits a corresponding synchronization signal to the shutter glasses 14 for controlling the shutters of the left lens and the right lens of shutter glasses 14 to be turned on only when the display device 12 plays the left-eye image or the right-eye image with the leftward offset of 15 degree. In such a manner, the user can view the 3D image with the leftward offset of 15 degree due to persistence of vision.

It should be noticed that the said third infrared detecting device 22 is an omissible part for simplifying the mechanical design of the image processing system 10 as well as reducing the data processing amount required for detecting visual angles and playing images. In other words, the image processing system 10 can omit disposal of the third infrared detecting device 22 and only have a horizontal positioning function. That is, the detecting module 16 can only detect the offset angle included between the vertical center surface 32 and the line formed by the shutter glasses 14 and the first infrared detecting device 18 on the horizontal surface 30. As for which design is adopted, it depends on practical applications of the image processing system 10.

In addition, the image processing system 10 can be applied to a multi-user environment. In other words, if there are more than two users with the shutter glasses 14 to view the 3D images played by the display device 12, the image processing system 10 utilizes the detecting module 16 to perform visual angle detection for each shutter glasses 14, and then utilizes a corresponding synchronization signal to control the switching frequency of each shutter glasses 14 so that each user can view the 3D image corresponding to his visual angle. As for the design for transmitting the synchronization signal, it can be adopted a signal transmitting method commonly seen in the prior art, such as transmitting the corresponding synchronization signal one on one, transmitting the synchronization signal in broadcasting and so on.

Compared with the prior art, the image processing system of the present invention utilizes an infrared detecting device to detect a distance between the display device and the shutter glasses, calculates a visual angle included between the display device and the shutter glasses based on the cosine law so as to perform horizontal and vertical positioning between the detecting device and the shutter glasses, and then transmits a synchronization signal corresponding to the visual angle to control a switching frequency of the shutter glasses, so as to make the shutter glasses receive one of the plurality of 3D images corresponding to the visual angle. In such a manner, the present invention allows a user with the shutter glasses to view the corresponding 3D images at different visual angles so as to provide the user with a more 3D visual feeling.

Those skilled in the art will readily observe that numerous modifications and alterations of the device and method may be made while retaining the teachings of the invention.

What is claimed is:

1. A method for playing a corresponding 3D image according to different visual angles, the method comprising:

utilizing a first infrared detecting device disposed at [a vertical center] *an* axis of [the] *a* display device to detect a first distance between the first infrared detecting device and [the] *a* shutter glasses;

utilizing a second infrared detecting device disposed on the display device and disposed at [the same horizontal] *another* axis *perpendicular to the axis* with the first infrared detecting device to detect a second distance between the second infrared detecting device and the shutter glasses;

calculating a first offset angle of a visual angle according to the first distance, the second distance, a distance between the first infrared detecting device and the second infrared detecting device, and the cosine law without coordinate calculation, the first offset angle being an angle between the shutter glasses not located at a [horizontal] surface where the first and second infrared detecting devices are located and [a horizontal] *the another* axis relative to the first infrared detecting device;

setting the first offset angle as an offset angle between a vertical projection position of the shutter glasses on the [horizontal] surface and the [horizontal] *another* axis relative to the first infrared detecting device;

setting an complementary angle of the offset angle as a horizontal offset angle of the shutter glasses relative to [a vertical center] *another* surface of the display device, *the axis being located on the another surface, and the another surface being perpendicular to the surface*;

performing horizontal positioning of the shutter glasses relative to the display device according to the horizontal offset angle;

playing, by the display device, a plurality of 3D image sets with different visual angles at a specific frequency;

transmitting, by [the] *a* detecting module, a synchronization signal corresponding to the horizontal offset angle to the shutter glasses; and controlling a switching frequency of the shutter glasses according to the synchronization signal so as to make the shutter glasses capable of receiving one of the plurality of 3D image sets corresponding to the horizontal offset angle.

2. The method of claim 1 further comprising:

utilizing a third infrared detecting device disposed at another position of the [vertical center] axis of the display device to detect a third distance between the third infrared detecting device and the shutter glasses; and calculating a second offset angle of the visual angle according to the first distance, the third distance, a distance between the first infrared detecting device and the third infrared detecting device, and the cosine law;

wherein the second offset angle is substantially equal to a complementary angle of a vertical offset angle of the shutter glasses relative to [a horizontal] *the* surface of the display device.

3. The method of claim 1, wherein playing, by the display device, the plurality of 3D image sets with different visual angles at the specific frequency comprises:

playing, by the display device, the plurality of 3D image sets with different visual angles at a frequency of 120 Hz.

4. An image processing system for playing a corresponding 3D image according to different visual angles, the image processing system comprising:

a display device for playing a plurality of 3D image sets at a specific frequency;

a shutter glasses located at a position corresponding to a visual angle included between the display device and the shutter glasses, the shutter glasses used for receiving one of the plurality of 3D image sets corresponding to the visual angle; and a detecting module coupled to the display device and the shutter glasses, the detecting module comprising:

a first infrared detecting device disposed at [a vertical center] *an* axis of the display device, the first infrared detecting device used for detecting a first distance between the first infrared detecting device and the shutter glasses;

a second infrared detecting device disposed on the display device and disposed at [the same horizontal] *another* axis *perpendicular to the axis* with the first infrared device, the second infrared detecting device used for detecting a second distance between the second infrared detecting device and the shutter glasses; and a processing unit coupled to the first infrared detecting device and the second infrared detecting device, for calculating a first offset angle of the visual angle according to the first distance, the second distance, a distance between the first and second infrared detecting devices, and the cosine law without coordinate calculation, the first offset angle being an angle between the shutter glasses not located at a [horizontal] surface where the first and second infrared detecting devices are located and [a horizontal] *the another* axis relative to the first infrared detecting device, the processing unit being further for setting the first offset angle as an offset angle between a vertical projection position of the shutter glasses on the [horizontal] surface and the [horizontal] *another* axis relative to the first infrared detecting device, setting an complementary angle of the offset angle as a horizontal offset angle of the shutter glasses relative to [a vertical center] *another* surface of the display device, performing horizontal positioning of the shutter glasses according to the horizontal offset angle, and controlling the first infrared detecting device to transmit a synchronization signal corresponding to the horizontal offset angle to the shutter glasses so as to control a switching frequency of the shutter glasses*;*

*wherein the axis is located on the another surface, and the another surface is perpendicular to the surface where the first and second infrared detecting devices are located.*

5. The image processing system of claim 4, wherein the detecting module further comprises:

a third infrared detecting device disposed at another position of the [vertical center] axis of the display device and coupled to the processing unit, the third infrared detecting unit used for detecting a third distance between the third infrared detecting device and the shutter glasses;

wherein the processing unit calculates a second offset angle of the visual angle according to the first distance, the third distance, a distance between the first infrared detecting device and the third infrared detecting device, and the cosine law, and the second offset angle is substantially equal to a complementary of a vertical offset angle of the shutter glasses relative to [a horizontal] *the* surface of the display device.

6. The image processing system of claim 4, wherein the shutter glasses is an infrared shutter glasses.

7. The image processing system of claim 4, wherein the specific frequency is 120 Hz.

8. The image processing system of claim 4, wherein the display device is a liquid crystal display device.

* * * * *